(12) United States Patent
Noguchi et al.

(10) Patent No.: US 7,267,364 B2
(45) Date of Patent: Sep. 11, 2007

(54) CURTAIN AIRBAG DEVICE

(75) Inventors: Atsushi Noguchi, Moriyama (JP); Tetsu Mitsuo, Nissin (JP)

(73) Assignee: Takata Corporation, Tokyo (JP)

( * ) Notice: Subject to any disclaimer, the term of this patent is extended or adjusted under 35 U.S.C. 154(b) by 268 days.

(21) Appl. No.: 11/013,914

(22) Filed: Dec. 17, 2004

(65) Prior Publication Data

US 2005/0134029 A1    Jun. 23, 2005

(30) Foreign Application Priority Data

Dec. 19, 2003    (JP) .............................. 2003-423081

(51) Int. Cl.
   *B60R 21/16*    (2006.01)
(52) U.S. Cl. .................... 280/730.2; 280/749
(58) Field of Classification Search ............. 280/730.2, 280/749
   See application file for complete search history.

(56) References Cited

U.S. PATENT DOCUMENTS

| 6,237,938 | B1 | 5/2001 | Boxey |
| 6,471,240 | B2 * | 10/2002 | Bakhsh et al. ............... 280/729 |
| 6,685,219 | B1 * | 2/2004 | Yamaji et al. ........... 280/730.2 |
| 6,783,152 | B2 | 8/2004 | Tanase et al. |
| 6,866,293 | B2 | 3/2005 | Ogata |

FOREIGN PATENT DOCUMENTS

| JP | 2003-54351 A | 2/2003 |
| JP | 2004-67045 A | 3/2004 |

\* cited by examiner

*Primary Examiner*—Eric Culbreth
(74) *Attorney, Agent, or Firm*—Foley and Lardner LLP

(57) ABSTRACT

A curtain airbag device which allows quick deployment of a curtain airbag. When an inflator is activated, a curtain airbag is deployed downward along the cabin-side of a pillar garnish. During the deployment, the rear portion of the curtain airbag is guided by a guide rod via a link strap. The curtain airbag include first vertical chamber extending from the upper end to the lower end of the curtain airbag along the guide rod and having the maximum horizontal sectional area when being inflated. An angle defined by a centerline in the first vertical chamber and a vertical line is within a range of ±20°.

4 Claims, 3 Drawing Sheets

CURTAIN AIRBAG DEVICE

BACKGROUND

The present invention relates to a curtain airbag device provided with a curtain airbag that is capable of being deployed along an inner side surface of a vehicle cabin.

In a vehicle provided with a curtain airbag device, when the vehicle is involved in, for example, a side-on collision or rollover, a curtain airbag is deployed downward along an inner side surface (for example, doors and pillars) of the vehicle cabin so as to protect the head of each vehicle occupant and to keep each vehicle occupant inside the vehicle cabin.

U.S. Pat. No. 6,237,938 (incorporated by reference herein in its entirety) discloses an example in which a guide element is disposed along a C pillar. Specifically, such a guide element is for guiding a rear portion of a curtain airbag, which is inflatable along the inner side of a vehicle cabin, downward along the pillar.

Moreover, such conventional guide elements each include a track member having a box-shaped cross-section and a slider element that is disposed within the track member and is movable in the longitudinal direction of the track member. The rear portion of a curtain airbag is fixed to the slider element. In order to prevent the rear portion of each curtain airbag from being retracted upward after being moved downward, latches are disposed at a regular interval along the track member.

The top and bottom ends of a track member are provided with mounted flanges, and each of the flanges is fixed to the corresponding C pillar with a bolt or a screw.

SUMMARY

One embodiment of the invention relates to a curtain airbag device. The curtain airbag device comprises a curtain airbag that is capable of being deployed downward along an inner side surface of a vehicle cabin and a guide element attached to a pillar of a vehicle and extending in the vertical direction, guiding the curtain airbag for the downward deployment. The curtain airbag comprises a first vertical chamber that is inflatable to protrude along the guide element from an upper end to a lower end of the curtain airbag and a vertical centerline dividing the first vertical chamber in the width direction of the first vertical chamber that is inclined within a range of ±20° with respect to the vertical direction.

According to another embodiment, a vehicle is provided. The vehicle comprises a curtain airbag capable of being deployed downward along an inner side surface of a vehicle cabin, an inflator for supplying gas to the curtain airbag and a guide element attached to a pillar of the vehicle and extending in the vertical direction, guiding the curtain airbag for downward deployment. The curtain airbag comprises a first vertical chamber that is inflatable to protrude along the guide element from an upper end to a lower end of the curtain airbag and a vertical centerline dividing the first vertical chamber in the width direction of the first vertical chamber that is inclined within a range of ±20° with respect to the vertical direction.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1(a) illustrates a curtain airbag disposed along a roof side to a C pillar of a vehicle, and a guide rod of the curtain airbag. FIG. 1(b) is an enlarged perspective view around a B portion shown in FIG. 1(a). FIG. 1(c) illustrates the B portion shown in FIG. 1(b) provided with a pillar garnish.

DETAILED DESCRIPTION

One object of the present invention is to provide a curtain airbag device in which a curtain airbag is capable of being smoothly deployed along a guide element.

The curtain airbag device according to an embodiment includes a curtain airbag that is capable of being deployed downward along an inner side surface of a vehicle cabin; and a guide element attached to a pillar of a vehicle and extending in the vertical direction, the guide element guiding the curtain airbag for the downward deployment. Furthermore, the curtain airbag includes a first vertical chamber that is inflatable to protrude along the guide element from the upper end to the lower end of the curtain airbag; and a vertical centerline dividing the first vertical chamber in the width direction of the first vertical chamber is inclined within a range of ±20° with respect to the vertical direction.

According to an embodiment of the curtain airbag device, since the first vertical chamber is quickly inflated in the substantially vertical direction during the deployment of the curtain airbag, the curtain airbag can be deployed very quickly while being guided by the guide element.

In an embodiment, the guide element preferably guides a link strap protruding from the lower portion of the first vertical chamber of the curtain airbag. According to such a structure, when the first vertical chamber is inflated downward in the substantially vertical direction, the link strip is pulled by the lower portion of the first vertical chamber such that the link strip can smoothly move downward in the substantially vertical direction.

In an embodiment, the curtain airbag preferably includes vertical chambers extending from the upper end to the lower end of the curtain airbag in addition to the first vertical chamber; and when the curtain airbag is deployed, the horizontal sectional area of the first vertical chamber is preferably larger than those of the vertical chambers. This structure allows a large amount of gas to quickly flow into the first vertical chamber so as to quickly inflate the first vertical chamber.

According to an embodiment of the curtain airbag device, during the deployment of the curtain airbag, the curtain airbag is guided by the guide element and the first vertical chamber disposed near the guide element of the curtain airbag is quickly inflated in the downward direction so as to allow quick deployment of the curtain airbag.

Figure 1A:
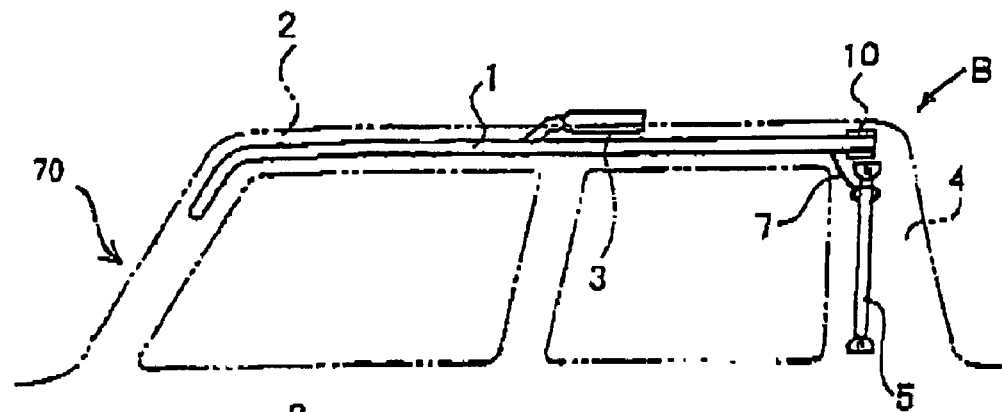
FIGS. 1(a), 1(b) and 1(c) illustrate a curtain airbag device according to an embodiment of the present invention.
Figure 1B:
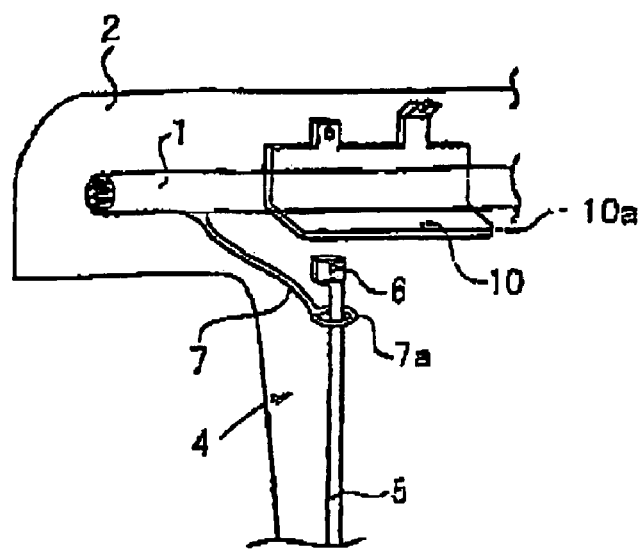
Figure 1C:
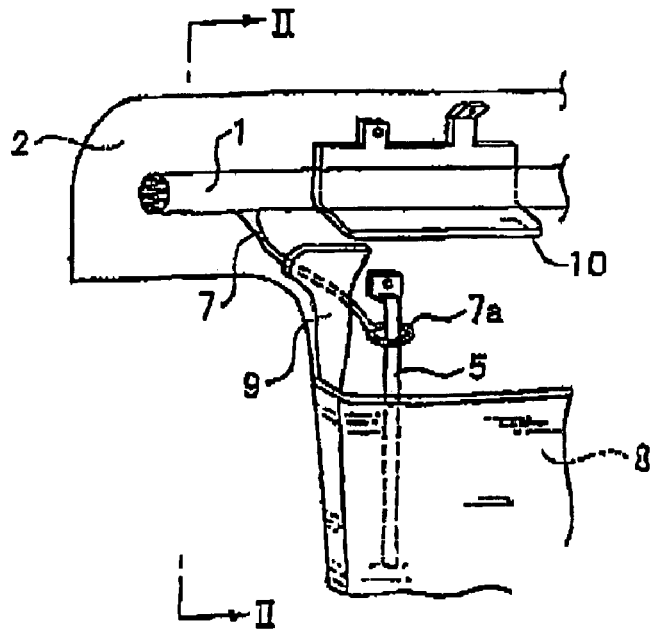
Figure 2:
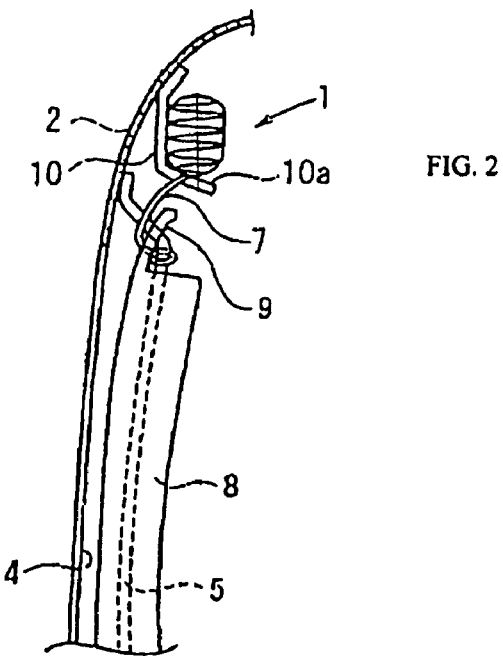
FIG. 2 is a cross-sectional view taken along line II-II in FIG. 1(c).
Figure 3A:
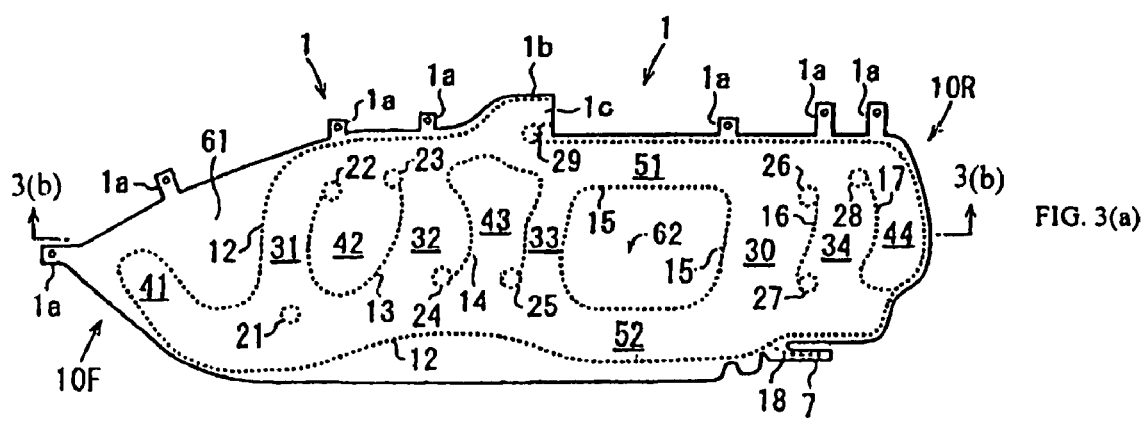
FIGS. 3(a) and 3(b) are a side view and a cross-sectional view of the curtain airbag respectively.
Figure 3B:
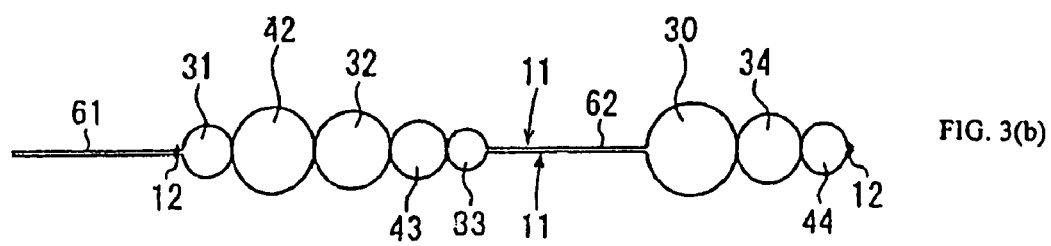
Figure 4:
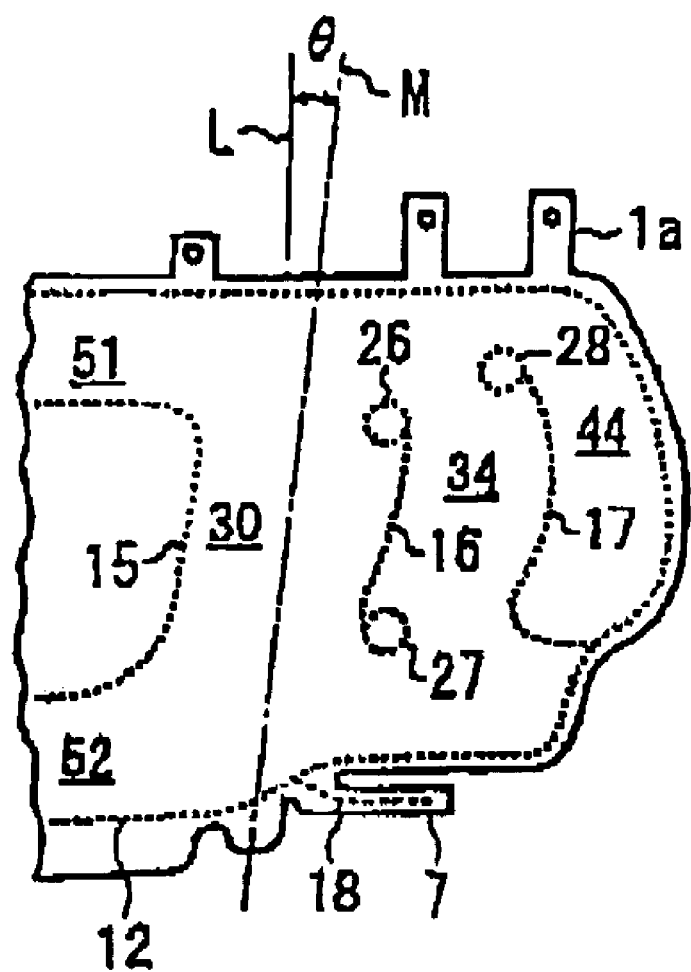
FIG. 4 is a enlarged view of a rear portion of the curtain airbag.

An embodiment will now be described with reference to the drawings. FIGS. 1(a), 1(b), and 1(c) illustrate a curtain airbag device according to an embodiment of the present invention. FIG. 1(a) illustrates a curtain airbag disposed along a roof side to a C-pillar of a vehicle, and a guide rod of the curtain airbag. FIG. 1(b) is an enlarged perspective view around a B portion shown in FIG. 1(a). FIG. 1(c) illustrates perspective view of the B portion shown in FIG. 1(b) provided with a pillar garnish. In FIGS. 1(a) and 1(b), the pillar garnish is not illustrated. FIG. 2 is a cross-sectional view taken along line II-II in FIG. 1(c). FIG. 3(a) is a side view illustrating a state in which the curtain airbag is inflated. FIG. 3(b) is a cross-sectional view taken along line 3(b)-3(b) in FIG. 3(a). FIG. 4 is an enlarged view of a rear portion of the curtain airbag.

According to this embodiment, a curtain airbag 1 is disposed along a roof side 2 of a vehicle 70 (a border section between the ceiling and inner side surface of a vehicle 70 cabin) while being folded in a slender manner in the longitudinal direction of the vehicle 70. When a vehicle 70 is involved in a side-on collision or a rollover, for example, the curtain airbag 1 is inflated as a result of gas sent from an inflator 3. The curtain airbag 1 is deployed in the downward direction of the vehicle 70 body along the side surface, i.e. doors and pillars, in the vehicle 70 cabin. An upper edge of the curtain airbag 1 is provided with tabs 1a (shown in FIG. 3(a)) that are fastened to the roof side 2.

Referring to FIGS. 3(a) and 3(b), the central portion of the upper edge of the curtain airbag 1 with respect to the longitudinal direction is provided with a projection 1b that extends upward. The projection 1b is provided with a gas inlet 1c. The tip of the inflator 3 is inserted into the gas inlet 1c and is clamped thereto with a band (not shown).

A C pillar 4 of the vehicle 70 has a guide rod 5 attached thereto, which functions as a guide element for guiding the rear portion of the curtain airbag 1 along the C pillar 4 while the curtain airbag 1 is being deployed along the C pillar 4 in the downward direction of the vehicle 70 body. The guide rod 5 is a rod-like element that extends along the C pillar 4 in the vertical direction of the vehicle 70 body. Both the upper and lower ends of the guide rod 5 are fixed to the C pillar 4 with, for example, bolts.

The bottom corner area in the rear portion of the curtain airbag 1 has a base end of link strap 7 attached thereto. On the other hand, a loop 7a at a front end of the link strap 7 is loosely fixed around the guide rod 5. The loop 7a is movable along the guide rod 5 in the vertical direction.

A pillar garnish 8 covers the cabin-side of the C pillar 4. A doorframe portion of the C pillar 4 has a weather strip (not shown) attached thereto. The side edge of the pillar garnish 8 is in contact with the weather strip.

A guide member 9 protrudes upward from the top end of the pillar garnish 8 so as to guide the link strip 7 into the space between the side edge of the pillar garnish 8 and the weather strip at the early stage of the deployment of the curtain airbag 1. In this embodiment, the guide member 9 is integrated with the pillar garnish 8; however, the guide member 9 may be attached to the pillar garnish 8.

A curtain guide member 10, also known as a jump base, is disposed on the roof side 2 above the C pillar 4. At the beginning of deployment of the curtain airbag 1, the curtain-guide member 10 allows the curtain airbag 1 to pass over the top of the pillar garnish 8 so as to guide the curtain airbag 1 towards the interior of the vehicle 70 cabin. As shown in FIG. 2, the bottom portion 10a of this curtain-guide member 10 protrudes downslope from the roof side 2 towards the interior of the vehicle 70 cabin.

As shown in FIGS. 1(c) and 2, the link strap 7 is disposed between the guide member 9 and the C pillar 4 before the curtain airbag 1 is deployed.

The guide member 9 protrudes upward from the front edge of the pillar garnish 8. The side edge of the pillar garish 8 is connected to the side edge of the guide member 9, and the connection from a consecutive smooth plane.

Although not shown, the roof side 2 is provided with a roof-side garnish that also covers the curtain airbag 1. This roof-side garnish is disposed so as to face the pillar garnish 8. This roof-side garnish covers the guide member 9.

This curtain airbag 1 is formed of two layers of sheets 11 having substantially the same shape; such that one of the sheets faces an inner side surface of the vehicle 70 cabin and another faces the interior of the vehicle 70 cabin. The two sheets 11 are connected to each other via linear connected portions 12 to 18 and circular connected portions 21 to 29 so as to form a first vertical chamber 30, vertical chambers 31 to 34, bag chambers 41 to 44, horizontal chambers 51 and 52, and non-inflatable portions 61 and 62.

The linear connected portion 12 to 18 and the circular connected portions 21 to 29 hermetically combine the sheets 11 together. For the connection between the two sheets 11, high-strength connecting means (such as stitching with high-strength threads, bonding with an adhesive having high adhesivity, or welding) is used so that the two sheets 11 are prevented from being separated from each other even when the internal pressure of the curtain airbag 1 reaches the upper limit pressure value.

The linear connected portion 12 extends substantially around the airbag 1, but at a front portion 10F of the curtain airbag 1, the linear connected portion 12 extends downward from the upper edge of the front portion 10F so as to form a substantially U-shape. This forms the non-inflatable portion 61 along the upper edge of the front portion 10F and the bag chamber 41 at the forefront part of the front portion 10F.

The linear connected portion 12 extends along an edge of the projection 1b of the curtain airbag 1, but is cut off at the rear edge of the projection 1b so as to form the gas inlet 1c of the curtain airbag 1.

The linear connected portion 13 is disposed slightly towards the front of the curtain airbag 1 with respect to the center of the curtain airbag 1. The linear connected portion 13 is U-shaped, and its inner region forms the bag chamber 42. The upper portion of the bag chamber 42 communicates with the gas inlet 1c, whereas the lower portion has no openings.

The linear connected portion 13 and the orbital linear connected portion 12 adjacent to the front portion of the curtain airbag 1 form the vertical chamber 31 therebetween. The upper portion of the vertical chamber 31 communicates with the gas inlet 1c, and the lower portion communicates with the bag chamber 41 and with the lower portion of the vertical chamber 32, which will be described below. To prevent the lower portion of the vertical chamber 31 from being over-inflated, the circular connected portion 21 is provided below the vertical chamber 31.

The linear connected portion 14 has a reversed U-shape is disposed at the central portion of the curtain airbag 1 with respect to the longitudinal direction. The inner region of the linear connected portion 14 forms the bag chamber 43. The lower portion of the bag chamber 43 communicates with the lower portions of the vertical chambers 32 and 33, whereas the upper portion of the bag chamber 43 has no openings.

The linear connected portion 14 and the linear connected portion 13 form the vertical chamber 32 therebetween. The upper portion of the vertical chamber 32 communicates with the gas inlet 1*c*.

The linear connected portion 15 is disposed slightly towards the back of the curtain airbag 1 with respect to the center of the curtain airbag 1. The linear connected portion 15 is substantially square-shaped. The upper side and the lower side of the linear connected portion 15 are respectively not in contact with the linear connected portion 12 adjacent to the upper edge and the lower edge of the curtain airbag 1. Thus, the horizontal chamber 51 is formed between the linear connected portion 12 adjacent to the upper edge of the curtain airbag 1 and the upper side of the linear connected portion 15, and the horizontal chamber 52 is formed between the linear connected portion 12 adjacent to the lower edge of the curtain airbag 1 and the lower side of the linear connected portion 15.

The linear connected portion 15 and the linear connected portion 14 form the vertical chamber 33 therebetween. The upper portion of the vertical chamber 33 communicates with the front portion of the horizontal chambers 51 and with the gas inlet 1*c*. The lower portion of the vertical chamber 33 communicates with the lower portion of the bag chamber 43 and the front portion of the horizontal chamber 52.

The inner region of the linear connected portion 15 is cut off from the gas inlet 1*c* so as to form the non-inflatable portion 62.

At the rear portion of the curtain airbag 1, the linear connected portion 16 extends in the vertical direction. Moreover, further towards the back of the curtain airbag 1, the linear connected portion 17 having a substantial L-shape is disposed.

The linear connected portions 15 and 16 form the first vertical chamber 30 therebetween. The upper and lower portions of the first vertical chamber 30 respectively communicate with the horizontal chambers 51 and 52.

The linear connected portions 16 and 17 form the vertical chamber 34 therebetween. The upper and lower portions of the vertical chamber 34 respectively communicate with the upper and lower portions of the first vertical chamber 30.

The linear connected portion 17 and the linear connected portion 12 adjacent to the rear edge of the curtain airbag 1 form the bag chamber 44 therebetween. The upper portion of the bag chamber 44 communicates with the upper portion of the vertical chamber 34, whereas the lower portion of the bag chamber 44 has no openings.

Each end of the linear connected portions 13, 14, 16, and 17 is provided with the corresponding circular connected portions 22 to 28 for reinforcement. The lower end of the linear connected portion 17 is connected with the linear connected portion 12.

The link strap 7 is positioned below the first vertical chamber 30. Slender portions extending from the sheets 11 are combined together via the linear connected portion 18 so as to form the link strap 7.

Referring to FIGS. 3(*a*), 3(*b*) and 4, according to an embodiment, the rear side of the linear connected portion 15 substantially extends in the vertical direction. This rear side of the linear connected portion 15 and the linear connected portion 16 extending in the vertical direction form the first vertical chamber 30 therebetween. The first vertical chamber 30 extends from the upper edge to the lower edge of the curtain airbag 1. A line (centerline) M (shown in FIG. 4) extends vertically through the center of the first vertical chamber 30 such that the width of the first vertical chamber 30 in the horizontal direction of the curtain airbag 1 is separated into halves. The line M is inclined at an angle of $\theta$ with respect to a vertical line L. This angle is preferably within a range of $\pm 20°$, more preferably, $\pm 15°$, and most preferably, $\pm 10°$. That is to say, the line M may be inclined from the vertical line L towards the rear or front portion of the curtain airbag 1 within a range of $\pm 20°$. The line M may coincide with the vertical line L.

The vertical chambers 31 to 34 similarly extend from the upper edge to the lower edge of the curtain airbag 1. As shown in FIG. 3(*b*), when the curtain airbag 1 is inflated, the horizontal sectional area of the first vertical chamber 30 is larger than those of the vertical chambers 31 to 34.

The horizontal sectional area of the first vertical chamber 30 is preferably 1.1 to 1.5 times, more preferably, 1.1 to 1.3 times as large as the largest horizontal sectional area in the vertical chambers 31 to 34.

When a vehicle 70 provided with such a curtain airbag device is involved in a side-on collision or a rollover, the inflator 3 generates gas so as to inflate the curtain airbag 1. The curtain airbag 1 pushes open the roof-side garnish, and the curtain-guide member 10 allows the curtain airbag 1 to pass over the top end of the pillar garnish 8 as to guide to curtain airbag 1 towards the interior of the vehicle 70 cabin. Subsequently, the curtain airbag 1 begins to be deployed downward along the cabin-side of a pillar garnish 8.

The rear portion of the deployed curtain airbag 1 is guided by the guide rod 5 via the link strap 7. The link strap 7 starts moving downward along the guide rod 5 when the curtain airbag 1 begins to be deployed. At this moment, the link strap 7 is smoothly guided into the space between the pillar garnish 8 and the weather strip by the guide member 9. The link strap 7 moves downward while ripping through the pillar garnish 8 and the weather strip during the deployment of the curtain airbag 1.

The link strap 7 moves downward along the guide rod 5 until the curtain airbag 1 reaches the bottommost point of deployment. Since to curtain airbag 1 connects with the guide rod 5 via the link strap 7, the curtain airbag 1 can be deployed along the side surface of the vehicle 70 cabin.

According to the above-described embodiment, since the horizontal sectional area (the horizontal sectional area when the curtain airbag 1 is inflated, and so forth) of the first vertical chamber 30 is larger than those of the vertical chambers 31 to 34, a large amount of gas from the gas inlet 1*c* smoothly flows into the first vertical chamber 30 to quickly inflate the first vertical chamber 30 in the downward direction. Accordingly, the curtain airbag 1 can be quickly deployed along the guide rod 5. In particular, since the angle defined by the line M and the vertical line L is within the range of $\pm 20°$, the first vertical chamber 30 is inflated downward in the substantially vertical direction. Thus, the curtain airbag 1 can be quickly inflated in the downward direction.

While the invention is described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, the number and positions of the vertical chambers and the bag chambers are not limited to those in the drawings. Therefore, it is intended that the invention not be limited to the particular embodiment disclosed as the best mode contemplated for carrying out this invention. Furthermore, any combination of embodiments may be used. All references and publications cited herein are incorporated by reference in their entireties.

What is claimed is:

1. A curtain airbag device, comprising:
a curtain airbag that is capable of being deployed downward along an inner side surface of a vehicle cabin; and
a guide element attached to a pillar of a vehicle and extending in the vertical direction, guiding the curtain airbag for the downward deployment,
wherein the curtain airbag comprises:
a first vertical chamber that is inflatable to protrude along the guide element from an upper end to a lower end of the curtain airbag, wherein the first vertical chamber is positioned so that a centerline dividing the first vertical chamber in the width direction is inclined within a range of ±20° with respect to the vertical direction of the vehicle cabin, and
wherein the curtain airbag further comprises vertical chambers extending from the upper end to the lower end of the curtain airbag; and when the curtain airbag is deployed, a horizontal sectional area of the first vertical chamber is larger than those of the vertical chambers.

2. The curtain airbag device according to claim 1, wherein a link strap protrudes from a lower portion of the first vertical chamber of the curtain airbag and is fixed to the guide element.

3. A vehicle, comprising:
a curtain airbag capable of being deployed downward along an inner side surface of a vehicle cabin;
an inflator for supplying gas to the curtain airbag; and
a guide element attached to a pillar of the vehicle and extending in the vertical direction, guiding the curtain airbag for downward deployment,
wherein the curtain airbag comprises:
a first vertical chamber that is inflatable to protrude alone the guide element from an upper end to a lower end of the curtain airbag, wherein the first vertical chamber is positioned so that a centerline dividing the first vertical chamber in the width direction is inclined within a range of ±20° with respect to the vertical direction of the vehicle cabin, and
wherein the curtain airbag further comprises vertical chambers extending from the upper end to the lower end of the curtain airbag; and when the curtain airbag is deployed, a horizontal sectional area of the first vertical chamber is larger than those of the vertical chambers.

4. The vehicle according to claim 3, wherein a link strap protrudes from a lower portion of the first vertical chamber of the curtain airbag and is fixed to the guide element.

* * * * *